United States Patent
Wu et al.

(10) Patent No.: US 9,356,688 B2
(45) Date of Patent: May 31, 2016

(54) METHOD AND SYSTEM FOR FULL DUPLEX RELAYING IN A WIRELESS COMMUNICATION NETWORK

(75) Inventors: Tao Wu, Carlsbad, CA (US); Young Hoon Kwon, San Diego, CA (US); Yang Tang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1115 days.

(21) Appl. No.: 12/475,241

(22) Filed: May 29, 2009

(65) Prior Publication Data
US 2010/0027458 A1 Feb. 4, 2010

Related U.S. Application Data

(60) Provisional application No. 61/057,166, filed on May 29, 2008.

(51) Int. Cl.
| | | |
|---|---|---|
| *H04B 7/26* | (2006.01) | |
| *H04B 7/155* | (2006.01) | |
| *H04B 7/02* | (2006.01) | |

(52) U.S. Cl.
CPC .......... *H04B 7/2606* (2013.01); *H04B 7/026* (2013.01); *H04B 7/15592* (2013.01); *H04B 7/15507* (2013.01)

(58) Field of Classification Search
CPC ...... H04W 52/45; H04W 40/22; H04W 88/04
USPC ................................................. 455/445, 436
See application file for complete search history.

(56) References Cited

U.S. PATENT DOCUMENTS

| | | | | |
|---|---|---|---|---|
| 2008/0025248 | A1* | 1/2008 | Naden | 370/321 |
| 2008/0175183 | A1* | 7/2008 | Devroye et al. | 370/315 |
| 2009/0186645 | A1* | 7/2009 | Jaturong | H04L 5/0007 455/507 |
| 2009/0207778 | A1* | 8/2009 | Wang et al. | 370/315 |

OTHER PUBLICATIONS

Rezaei, S.S.C., et al., "Cooperative Strategies for the Half-Duplex Gaussian Parallel Relay Channel: Simultaneous Relaying versus Successive Relaying," Coding & Signal Transmission Laboratory Department of Electrical & Computer Engineering, Waterloo, ON, arXiv:0810.4657v1 [csIT], Oct. 26, 2008, 37 pages.

* cited by examiner

*Primary Examiner* — Michael Faragalla
*Assistant Examiner* — Chayce Bibbee
(74) *Attorney, Agent, or Firm* — Slater Matsil, LLP

(57) ABSTRACT

Embodiments of the present invention are systems and methods for wireless communication. According to one embodiment, a system for wireless communication comprises a first relay station, second relay station, and a base station. The first relay station and the second relay station are operable to receive and transmit wireless signals. The base station is operable to transmit the wireless signals to the first relay station and the second relay station in an interchanging pattern during successive time frames so that the first relay station and the second relay station forward the wireless signals to a mobile station.

24 Claims, 8 Drawing Sheets

| FRAME INDEX | 0 | 1 | 2 | 3 | 4 | 5 | 6 |
|---|---|---|---|---|---|---|---|
| BS | T-X0 | T-X1 | T-X2 | T-X3 | T-X4 | T-X5 | T-X6 |
| RS1 | R-X0 | T-X0 | R-X2 R-X1 | T-X2 | R-X4 R-X3 | T-X4 | R-X6 R-X5 |
| RS2 |  | R-X1 R-X0 | T-X1 | R-X3 R-X2 | T-X3 | R-X5 R-X4 | T-X5 |
| MS | R-X0 | R-X0 R-X1 | R-X1 R-X2 | R-X2 R-X3 | R-X3 R-X4 | R-X4 R-X5 | R-X5 R-X6 |

| FRAME INDEX | 0 | | 1 | | 2 | | 3 | | 4 | | 5 | | 6 | |
|---|---|---|---|---|---|---|---|---|---|---|---|---|---|---|
| LINK | DL | UL | DL | UL | DL | UL | DL | UL | DL | UL | DL | UL | DL | UL |
| BS | T-X0 | R-Y0<br>R-Y1 | T-X1 | R-Y1<br>R-Y2 | T-X2 | R-Y2<br>R-Y3 | T-X3 | R-Y3<br>R-Y4 | T-X4 | R-Y4<br>R-Y5 | T-X5 | R-Y5<br>R-Y6 | T-X6 | R-Y6<br>R-Y7 |
| RS1 | R-X0 | T-Y0 | T-X0 | R-Y2<br>R-Y1 | R-X2<br>R-X1 | T-Y2 | T-X2 | R-Y4<br>R-Y3 | R-X4<br>R-X3 | T-Y4 | T-X4 | R-Y6<br>R-Y5 | R-X6<br>R-X5 | T-Y6 |
| RS2 | | R-Y1<br>R-Y0 | R-X1<br>R-X0 | T-Y1 | T-X1 | R-Y3<br>R-Y2 | R-X3<br>R-X2 | T-Y3 | T-X3 | R-Y5<br>R-Y4 | R-X5<br>R-X4 | T-Y5 | T-X5 | R-Y7<br>R-Y6 |
| MS | R-X0 | T-Y1 | R-X0<br>R-X1 | T-Y2 | R-X1<br>R-X2 | T-Y3 | R-X2<br>R-X3 | T-Y4 | R-X3<br>R-X4 | T-Y5 | R-X4<br>R-X5 | T-Y6 | R-X5<br>R-X6 | T-Y7 |

FIG. 5

| FRAME INDEX | 0 | | 1 | | 2 | | 3 | | 4 | | 5 | | 6 | |
|---|---|---|---|---|---|---|---|---|---|---|---|---|---|---|
| LINK | DL | UL | DL | UL | DL | UL | DL | UL | DL | UL | DL | UL | DL | UL |
| BS | T-X0 | R-Y0 / R-Y1 | T-X1 | R-Y1 / R-Y2 | T-X2 | R-Y2 / R-Y3 | T-X3 | R-Y3 / R-Y4 | T-X4 | R-Y4 / R-Y5 | T-X5 | R-Y5 / R-Y6 | T-X6 | R-Y6 / R-Y7 |
| RS1 | R-X0 | | T-X0 | R-Y2 / R-Y1 | | T-Y2 | R-X3 / R-X2 | | T-X3 | R-Y5 / R-Y4 | | T-Y5 | R-X6 / R-X5 | |
| RS2 | | T-Y0 | | | T-X1 | R-Y3 / R-Y2 | | T-Y3 | R-X4 / R-X3 | | T-X4 | R-Y6 / R-Y5 | | T-Y6 |
| RS3 | | R-Y1 / R-Y0 | R-X1 / R-X0 | T-Y1 | R-X2 / R-X1 | | T-X2 | R-Y4 / R-Y3 | | T-Y4 | R-X5 / R-X4 | | T-X5 | R-Y7 / R-Y6 |
| MS | R-X0 | T-Y1 | R-X0 / R-X1 | T-Y2 | R-X1 / R-X2 | T-Y3 | R-X2 / R-X3 | T-Y4 | R-X3 / R-X4 | T-Y5 | R-X4 / R-X5 | T-Y6 | R-X5 / R-X6 | T-Y7 |

FIG. 9

| FRAME INDEX | 0 | | 1 | | 2 | | 3 | | 4 | | 5 | | 6 | |
|---|---|---|---|---|---|---|---|---|---|---|---|---|---|---|
| LINK | DL | UL | DL | UL | DL | UL | DL | UL | DL | UL | DL | UL | DL | UL |
| BS | T-X0 | R-Y0<br>R-Y1 | T-X1 | R-Y1<br>R-Y2 | T-X2 | R-Y2<br>R-Y3 | T-X3 | R-Y3<br>R-Y4 | T-X4 | R-Y4<br>R-Y5 | T-X5 | R-Y5<br>R-Y6 | T-X6 | R-Y6<br>R-Y7 |
| RS1 | R-X0 | T-Y0 | T-X0 | R-Y2<br>R-Y1 | R-X2<br>R-X1 | T-Y2 | T-X2 | R-Y4<br>R-Y3 | R-X4<br>R-X3 | T-Y4 | T-X4 | R-Y6<br>R-Y5 | R-X6<br>R-X5 | T-Y6 |
| RS2 | | | R-X1<br>R-X0 | | T-X1 | R-Y3<br>R-Y2 | R-X3<br>R-X2 | | T-X3 | R-Y5<br>R-Y4 | R-X5<br>R-X4 | | T-X5 | |
| RS3 | | R-Y1<br>R-Y0 | | T-Y1 | | R-Y3<br>R-Y2 | | T-Y3 | | R-Y5<br>R-Y4 | | T-Y5 | | R-Y7<br>R-Y6 |
| MS | R-X0 | T-Y1 | R-X0<br>R-X1 | T-Y2 | R-X1<br>R-X2 | T-Y3 | R-X2<br>R-X3 | T-Y4 | R-X3<br>R-X4 | T-Y5 | R-X4<br>R-X5 | T-Y6 | R-X5<br>R-X6 | T-Y7 |

FIG. 10

| FRAME INDEX | 0 | | 1 | | 2 | | 3 | | 4 | | 5 | | 6 | |
|---|---|---|---|---|---|---|---|---|---|---|---|---|---|---|
| LINK | DL | UL | DL | UL | DL | UL | DL | UL | DL | UL | DL | UL | DL | UL |
| BS | T-X0 | R-Y0 R-Y1 R-Y2 | T-X1 | R-Y1 R-Y2 R-Y3 | T-X2 | R-Y2 R-Y3 R-Y4 | T-X3 | R-Y3 R-Y4 R-Y5 | T-X4 | R-Y4 R-Y5 R-Y6 | T-X5 | R-Y5 R-Y6 R-Y7 | T-X6 | R-Y6 R-Y7 R-Y8 |
| RS1 | R-X0 | R-Y1 R-Y0 R-Y2 | T-X0 | T-Y1 | R-X2 R-X0 R-X1 | R-Y3 R-Y2 R-Y4 | T-X2 | T-Y3 | R-X4 R-X2 R-X3 | R-Y5 R-Y4 R-Y6 | T-X4 | T-Y5 | R-X6 R-X4 R-X5 | R-Y7 R-Y6 R-Y8 |
| RS2 | | T-Y0 | | R-Y2 R-Y1 R-Y3 | T-X1 | T-Y2 | R-X3 R-X1 R-X2 | R-Y4 R-Y3 R-Y5 | T-X3 | T-Y4 | R-X5 R-X3 R-X4 | R-Y6 R-Y5 R-Y7 | T-X5 | T-Y6 |
| RS3 | | T-Y1 | R-X1 R-X0 | R-Y3 R-Y1 R-Y2 | T-X0 | T-Y3 | R-X2 R-X1 R-X3 | R-Y5 R-Y3 R-Y4 | T-X2 | T-Y5 | R-X4 R-X3 R-X5 | R-Y7 R-Y5 R-Y6 | T-X4 | T-Y7 |
| RS4 | R-X2 R-Y0 R-Y1 | | | T-Y2 | R-X1 R-X0 R-X2 | R-Y4 R-Y2 R-Y3 | T-X1 | T-Y4 | R-X3 R-X2 R-X4 | R-Y6 R-Y4 R-Y5 | T-X3 | T-Y6 | R-X5 R-X4 R-X6 | R-Y8 R-Y6 R-Y7 |
| MS | R-X0 | T-Y2 | R-X0 R-X1 | T-Y3 | R-X0 R-X1 R-X2 | T-Y4 | R-X1 R-X2 R-X3 | T-Y5 | R-X2 R-X3 R-X4 | T-Y6 | R-X3 R-X4 R-X5 | T-Y7 | R-X4 R-X5 R-X6 | T-Y8 |

FIG. 12

METHOD AND SYSTEM FOR FULL DUPLEX RELAYING IN A WIRELESS COMMUNICATION NETWORK

This application claims the benefit of U.S. Provisional Application No. 61/057,166, filed on May 29, 2008, entitled "Method and Apparatus for Full Duplex Relaying with Coordinated Relay Stations in Wireless Communication Networks", which application is hereby incorporated herein by reference.

TECHNICAL FIELD

The present invention relates generally to a wireless communication system, and more particularly to a system and method for full duplex relaying in a wireless communication network.

BACKGROUND

Generally, as wireless cellular networks advance, such as beyond IMT-2000 or toward IMT-Advanced, wireless relaying technology has the potential to become increasingly used. These advanced wireless networks are generally accompanied with an increased operating carrier frequency. The increased carrier frequency generally results in greater signal attenuation that in turn may cause smaller cell sizes within the network. To combat the decreased cell sizes, wireless relaying may be used to propagate signals to a distance from a base station that the base station would otherwise be unable to service by itself. When wireless relaying is typically used, a single relay station is located between a base station and a wireless subscriber station, which is also called a mobile station or terminal. The base station generally transmits a signal to the relay station, and then the relay station will transmit the signal to the mobile station. This system is also known as a multi-hop network, where each link in the transmission of the signal is a hop. Other systems may include three or more hops in the transmission of the signal where two or more relay stations transmit signals serially between the relay stations.

The receive-and-transmit process of the relay station is what has become known in the art as half duplex mode. In half duplex mode, the relay station will in an alternating manner receive a signal from the base station and then transmit the signal to the mobile station in a time division multiplexing (TDM) fashion. In this mode, the base station and the mobile station are generally idle, in terms of transmitting or receiving signals, half of the time. For example, the mobile station typically is idle when the base station transmits to the relay station, and the base station is typically idle with regard to the particular mobile station when the relay station transmits to the mobile station.

The throughput of data to the mobile station is generally constrained because the base station and the mobile station are typically idle for such a significant amount of time in this half duplex mode. This constraint may adversely affect an end user at the mobile station, such as by inability to receive a sufficient amount of data or by delay in transmitting a large amount of data. Thus, there is a need in the art to obviate the deficiencies of this half duplex mode by the realization of a feasible and practical full duplex mode.

SUMMARY OF THE INVENTION

These and other problems are generally solved or circumvented, and technical advantages are generally achieved, by embodiments of the present invention.

In accordance with an embodiment of the present invention, a system for wireless communication comprises a first relay station, a second relay station, and a base station. The first relay station and the second relay station are operable to receive and transmit wireless signals. The base station is operable to transmit the wireless signals to the first relay station and the second relay station in an interchanging pattern during successive time frames so that the first relay station and the second relay station forward the wireless signals to a mobile station.

In accordance with another embodiment of the present invention, a method for matching relay stations for full duplex relaying comprises receiving information related to a mobile station, identifying a first relay station and a second relay station using the information related to the mobile station, and causing the first relay station and the second relay station to relay wireless signals to the mobile station in an interchanging pattern during immediately successive time frames. A first beam generated from the first relay station directed toward the mobile station does not generate substantial interference to the second relay station, and a second beam generated from the second relay station directed toward the mobile station does not generate substantial interference to the first relay station.

In accordance with another embodiment of the present invention, a method for wirelessly communicating comprises receiving first signal information during a first time frame, receiving second signal information during a second time frame, and combining the first signal information and the second signal information to obtain a transmitted signal that originated from a transmitting station during the first time frame. The first signal information includes signal information from the transmitted signal, and the second signal information includes a relay transmission of the transmitted signal.

In accordance with another embodiment of the present invention, a method for relaying in a wireless communication system comprises receiving a first data signal from a transmitting station during a first time frame, transmitting the first data signal to a receiving station during a second time frame immediately subsequent the first time frame, receiving a third data signal from the transmitting station during a third time frame immediately subsequent the second time frame, and transmitting the third data signal to the receiving station during a fourth time frame immediately subsequent the third time frame. The first data signal and the third data signal comprise only a portion of a data communication that further comprises a second data signal, wherein the second data signal is transmitted to the receiving station by a matched relay station during the third time frame.

In accordance with another embodiment of the present invention, a communication device comprises a transmitter for causing a first wireless communication message to be transmitted to first and second relay stations in an interchanging pattern during successive first direction time frames, and a receiver for receiving a second wireless communication message from the first and second relay stations in an interchanging pattern during successive second direction time frames.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is an exemplary transmission scheduling table of the system in FIG. 1 that includes both an uplink and downlink in each time frame;

FIG. 9 is a first exemplary transmission scheduling table of the system in FIG. 7;

FIG. 10 is a second exemplary transmission scheduling table of the system in FIG. 8;

FIG. 12 is an exemplary transmission scheduling table of the system in FIG. 10.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a wireless communications network that utilizes matched relay station to implement full duplexing. The invention may be applied to both ad hoc networks, cellular networks, and the like.

Figures 1, 2:
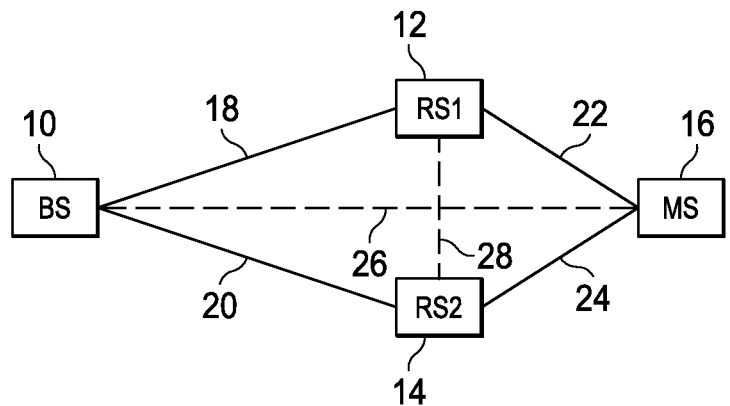
FIG. 1 is an exemplary system for implementing full duplex paired relaying in accordance with an embodiment of the present invention.
FIG. 2 is an exemplary transmission scheduling table of the system in FIG. 1.

FIG. 1 is an exemplary system for implementing full duplex paired relaying in accordance with an embodiment of the present invention. The system comprises a base station 10, a first relay station 12, a second relay station 14, and a mobile station 16. A first relay link 18 is illustrated between the base station 10 and the first relay station 12. A second relay link 20 is illustrated between the base station 10 and the second relay station 14. A first access link 22 and a second access link 24 are shown between the first relay station 12 and the mobile station 16 and between the second relay station 14 and the mobile station 16, respectively. Further, a direct link 26 between the base station 10 and the mobile station 16 and an interference link 28 between the first relay station 12 and the second relay station 14 are illustrated. A person having ordinary skill in the art will realize that a wireless communication network generally will comprise many more components, such as more relay stations, base stations, and mobile stations, however, such components are omitted for brevity and simplicity in the explanation of this and other embodiments.

The embodiment of FIG. 1 uses time division multiplexing to transmit a signal. In this case, the base station 10 transmits a signal alternatively between the first relay station 12 and the second relay station 14 during successive time frames. For example, in a given time frame, assuming the given time frame is some time frame subsequent to the initial time frame, base station 10 will wirelessly transmit a signal via the first relay link 18 to the first relay station 12, but not to the second relay station 14. In the next, or successive, time frame, the base station 10 will wirelessly transmit a signal via the second relay link 20 to the second relay station 14, but not to the first relay station 12. The base station 10 will continue to alternate its transmission signals between the first relay station 12 and the second relay station 14 through any remaining, successive time frames.

Similarly, each relay station will receive a signal and then transmit the signal to the mobile station 16 in successive time frames. For example, referencing the above discussed example, in the third time frame as the base station 10 transmits to the first relay station 12, the second relay station 14 transmits a signal via second access link 24 to the mobile station 16. Then during the fourth time frame as the base station 10 transmits to the second relay station 14, the first relay station 12 transmits a signal via first access link 22 to the mobile station 16.

Further, during these transmissions, a direct link 26 may be established between the base station 10 and the mobile station 16. Because of the relatively large distance between the base station 10 and the mobile station 16 compared to the distance between either the first relay station 12 or the second relay station 14 and the mobile station 16, any signal received by the mobile station 16 via the direct link 26 to the base station 10 will usually be attenuated or weaker compared to any signal received from the first or second relay station 12 or 14, respectively. Also, any signal received via direct link 26 will be received by the mobile station 16 at a time frame preceding the time frame that the signal would be received from either the first relay station 12 or the second relay station 14.

An interference link 28 may also occur in this embodiment. As previously discussed, while one relay station is transmitting a signal, the other relay station is receiving a signal. Thus, some unwanted interference can occur through interference link 28 between the first relay station 12 and the second relay station 14. However, as will be discussed later in detail, steps are taken to avoid or minimize the effect of such interference.

FIG. 2 represents the transmission of signals in tabular form, which will be explained with reference to FIG. 1. The alphanumeric "X#" in FIG. 2 represents a signal that originated at the base station 10 during the time frame indicated by the numeral. An "R" preceding the alphanumeric indicates the receiving of the signal indicated by the alphanumeric, and a "T" indicates the transmitting of the signal indicated.

At time frame 0, the base station 10 transmits signal X0 to the first relay station 12 which receives signal X0. Also at time X0, mobile station 16 receives an attenuated signal X0, as indicated in FIG. 2 by a smaller font, from the base station 10. At time frame 1, the base station 10 transmits signal X1, and the first relay station 12 transmits signal X0. The second relay station 14 receives signal X1 from the base station 10 and an interference signal X0 from the first relay station 12. The mobile station 16 receives signal X0 from the first relay station 12 and attenuated signal X1 from the base station 10. At time frame 2, the base station 10 transmits signal X2, and the second relay station 14 transmits signal X1. The first relay station 12 receives signal X2 from the base station 10 and an interference signal X1 from the second relay station 14. The mobile station 16 receives signal X1 from the second relay station 14 and attenuated signal X2 from the base station 10. This pattern continues until the communication is concluded.

From FIG. 2, it can be seen that the system allows for full-duplex relaying to the mobile station 16. Thus, the base station 10 is continually active with regard to the mobile station 16. The relay stations are not the limiting factor in data through-put by only permitting half-duplex transmissions.

As can be discerned from the above discussion, the signal received by the mobile station 16 at time frame i is the signal from one of the relay stations 12 or 14 that originated at the base station 10 at time frame i−1 plus the attenuated signal from the base station 10 at time frame i plus any noise. This can be characterized by the following equation:

$$y_i = x_{i-1} h_{Ri} + x_i h_{Bi} + n_i \text{ for } i > 0; \text{ and}$$

$$y_i = x_i h_{Bi} + n_i \text{ for } i = 0;$$

where $y_i$ is the signal received by the mobile station 16 at time frame i, $x_i$ is the signal that originates from the base station 10 at time frame i, $h_{Ri}$ is the effect of the transmission along an access link 22 or 24 from the transmitting relay station 12 or 14, respectively, at time frame i, $h_{Bi}$ is the effect of the transmission along direct link 26 from the base station 10 at time frame i, and $n_i$ is the Additive White Gaussian Noise (AWGN) at time frame i.

The received signal may be decoded in a manner that views the $x_i h_{Bi}$ and $n_i$ terms as interference to be filtered out; however, other embodiments of the invention use the $x_i h_{Bi}$ term to aid decoding the received signal. This latter method is called a Successive Interference Cancellation and Energy Combining (SICEC) algorithm.

In this scheme, the $x_{i-1}$ signal may be decoded in two consecutive time frames, time frames i−1 and i. In time frame i−1, after the typically stronger $x_{i-2}$ signal is decoded, $x_{i-1}$ may be decoded by using Successive Interference Cancellation (SIC). However, if $x_{i-1}$ cannot be decoded at time frame i−1 and the signal strength is larger than a certain threshold, then at time frame i, the energy from the signal $x_{i-1}$ at time frame i−1 will be combined with the signal $x_{i-1}$ at time frame i.

The signal strength on the first and second access links 22 and 24, respectively, for signal $x_i$ is assumed to be $P_{Xi}$. The signal strength on the direct link 26 for signal $x_i$ is assumed to be $aP_{Xi}$, where a is an attenuation factor that is greater than or equal to 0 and usually less than 1. Further, a signal-to-noise ratio (SNR) at a single time frame for a signal S is defined to be $$SNR_{R,S} = \frac{P_j}{\sigma^2}$$

along an access link 22 or 24 and $$SNR_{B,S} = \frac{aP_j}{\sigma^2} = aSNR_{R,S}$$

along the direct link 26.

At time frame i−1, SIC may be used to eliminate $x_{i-2} h_{Ri-1}$ such that the $x_{i-1} h_{Bi-1}$ term is left in $y_{i-1}$. Thus, at time frame i−1, a signal-to-noise ratio (SNR) may be determined for the $x_{i-1}$ signal from the base station 10. This SNR at time frame i−1 for $x_{i-1}$ is $SNR_{Xi-1,i-1} = aSNR_{R,Xi-1}$.

At time frame i, the SNR for signal $x_{i-1}$ from an access link 22 or 24 is $$SNR_{Xi-1,i} = \frac{P_{Xi-1}}{aP_{Xi} + n} = \frac{SNR_{R,Xi-1}}{aSNR_{R,Xi} + 1}.$$

From this, the Energy Combining algorithm combines the SNRs from time frames i−1 and i to obtain an enhanced SNR. This combining is also called maximum ratio combining. The enhanced SNR for signal $x_{i-1}$ may be shown as $$SNR_{Xi-1} = SNR_{Xi-1,i-1} + SNR_{Xi-1,i} = aSNR_{R,Xi-1} + \frac{SNR_{R,Xi-1}}{aSNR_{R,Xi-1} + 1}.$$

The enhanced SNR allows greater ease of decoding signal $x_{i-1}$ at time frame i.

A concrete example of the SICEC algorithm will be discussed with reference to FIG. 2. At time frame 2, signal X1 can be removed from the signal received at the mobile station 16 using SIC. The remaining signal comprises signal X2 and AWGN (not shown). If the signal strength of signal X2 is great enough, the mobile station may decode signal X2. However, if the signal is too weak to decode but is still above a threshold, the SICEC algorithm is activated in frame 3 to combine the energy from signal X2 received in frame 2 to the received signal in frame 3.

In time frame 2, $SNR_{X2,2} = aSNR_{R,X2}$. This is carried over to time frame 3, where $$SNR_{X2,3} = \frac{SNR_{R,X2}}{aSNR_{R,X3} + 1}.$$

Combining the two results in an enhanced SNR, $$SNR_{X2} = aSNR_{R,X2} + \frac{SNR_{R,X2}}{SNR_{R,X3} + 1}.$$

This increases the energy of the X2 signal in frame 3 to allow for easier and more efficient decoding.

Figure 3:
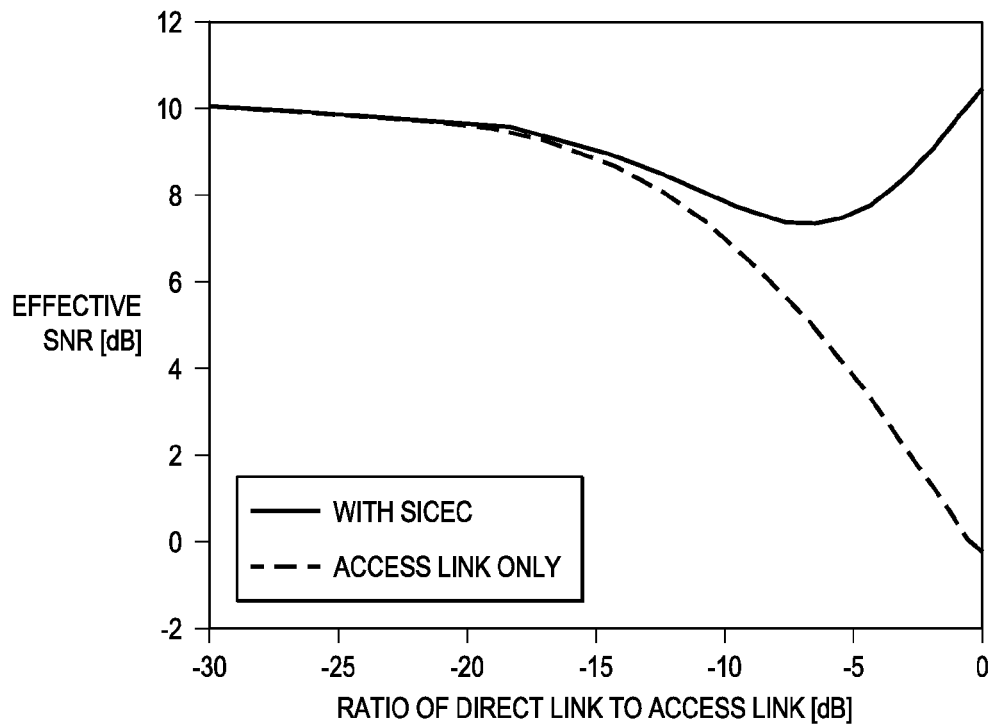
FIG. 3 is a chart demonstrating the benefit of using the Signal Interference Cancellation and Energy Combining (SICEC) algorithm, where the $SNR_R$ on access links is fixed at 10 dB.
Figure 4:
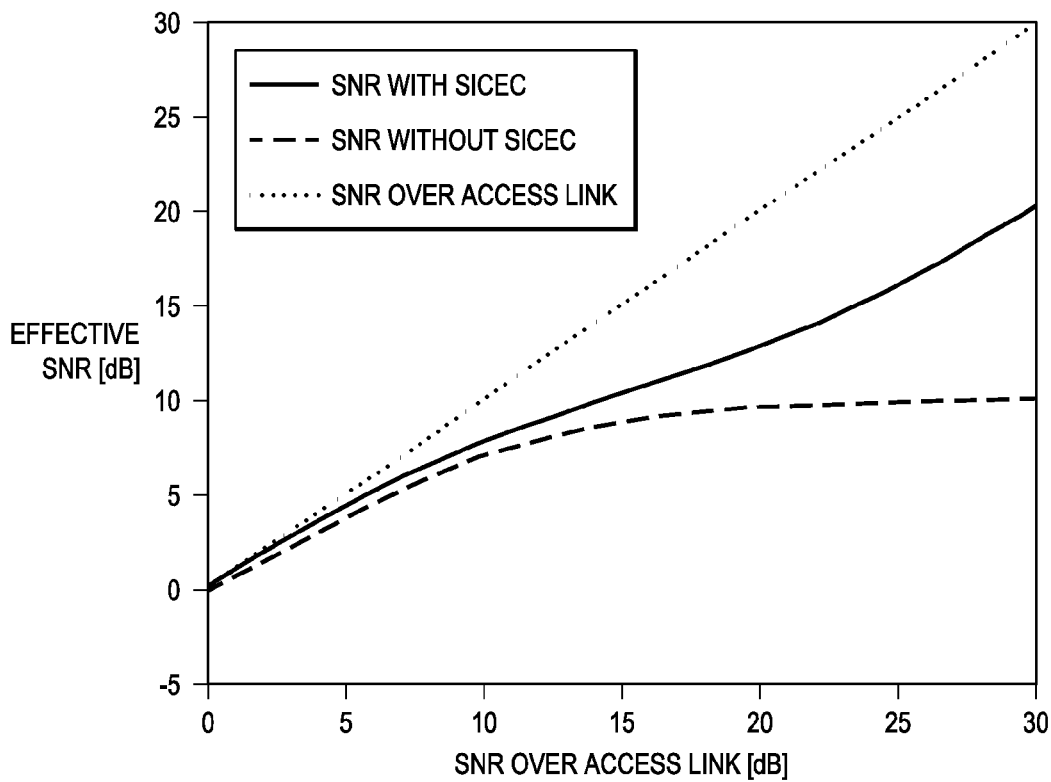
FIG. 4 is a chart demonstrating the benefit of using the SICEC algorithm, where the $SNR_R$ on access links is assumed to be 10 dB greater than the $SNR_B$ on the direct link.

FIGS. 3 and 4 demonstrate the benefit of using the SICEC scheme. In FIG. 3, the $SNR_R$ on the access links 22 and 24 from the first and second relay stations 12 and 14, respectively, is fixed at 10 dB. The y-axis represents the effective SNR in decibels at the mobile station 16, and the x-axis is the ratio of the $SNR_B$ of the direct link 26 to the fixed $SNR_R$ of the access links 22 and 24. The dashed line represents the function of the effective SNR when the mobile station 16 relies solely on the access links 22 and 24 for decoding and considers the direct link 26 to be interference. As the $SNR_B$ of the direct link 26 increases, and thus the ratio of the $SNR_B$ of the direct link 26 to the fixed $SNR_R$ increases toward 0 dB, the effective SNR at the mobile station 16 decreases. On the other hand, the solid line represents the function of the effective SNR when the mobile station 16 implements the SICEC scheme. In this scheme, the direct link 26 contributes to the decoding performance. Therefore, as the $SNR_B$ of the direct link 26 increases, it may take over in the decoding of the received signal. In the example in FIG. 3, when the $SNR_B$ of the direct link 26 increases such that the ratio is more than −7 dB, the direct link 26 takes over in decoding the signal. Further in this example, a threshold of −15 dB for the ratio can be set to activate the SICEC algorithm, although other thresholds are not excluded.

FIG. 4 demonstrates the effect of the $SNR_R$ of the access links 22 and 24 on the effective SNR at the mobile station 16. The y-axis represents the effective SNR in decibels at the mobile station 16, and the x-axis is the $SNR_R$ of the access links 22 and 24. In this example, $SNR_R$ is assumed to be 10 dB greater than the $SNR_B$ of the direct link 26. Again, the dashed line represents the function of the effective SNR when the mobile station 16 relies solely on the access links 22 and 24 for decoding and considers the direct link 26 to be interference. Without the SICEC algorithm, the effective SNR is capped at 10 dB regardless of the strength of the signal on the access link 22 or 24. The effective SNR is capped because without the SICEC $$SNR_{Xi-1} = \frac{SNR_{R,Xi-1}}{aSNR_{R,Xi}+1},$$

and thus, with an assumed $SNR_R$ 10 dB greater than $SNR_B$, $$\lim_{SNR_{R,Xi-1} \to \infty} \frac{SNR_{R,Xi-1}}{aSNR_{R,Xi}+1} = 10 \text{ dB},$$

where effectively $aSNR_{R,Xi}=SNR_{B,Xi}$. However, with the SICEC algorithm, as illustrated by the solid line, as the $SNR_R$ increases, so does the $SNR_B$ of the direct link 26, and the effective SNR is not capped but continues to increase almost linearly. As can be seen in the example, when $SNR_R$ approximately equals 21 dB, the $SNR_B$ of the direct link 26 takes over the effective SNR which allows the effective SNR to continue to increase.

All of the previous discussion has been directed to the transmission of data to the mobile station 16, or in other words, the downlink. However, a person of ordinary skill in the art will realize that wireless communication systems generally require both transmitting data to and receiving data from the mobile station 16. The reception of data from the mobile station 16 is generally referred to as the uplink. FIG. 5 is a table similar to FIG. 2, except it demonstrates the downlink (DL) as well as the uplink (UL). The downlink columns are identical to FIG. 2, and thus discussion here is omitted, and the same principles discussed with regard to FIG. 2 and the downlink apply equally to the uplink. Particularly, the decoding of uplink signal at the base station 10 may use the same SICEC algorithm that the mobile station 16 uses to decode the downlink signal.

In FIG. 5, alphanumeric "Y#" represents the uplink signal where the numeral represents the time frame in which the base station 10 will receive the uplink signal. Again, one relay station 12 or 14 may interfere via interference link 28 with the other relay station 14 or 12, respectively, while one is transmitting to the base station 10 along relay links 18 or 20 and the other is receiving from the mobile station 16 along access links 22 or 24. Also, the base station 10 may receive an attenuated uplink signal via direct link 26 from the mobile station 16 while the base station 10 is receiving a signal from a relay station 12 or 14. For example, at time frame 2 during the uplink, the mobile station 16 transmits uplink signal Y3, and the first relay station transmits uplink signal Y2. The second relay station 14 receives uplink signal Y3 from the mobile station 16 and an interference signal Y2 from the first relay station 12. The base station 10 receives uplink signal Y2 from the first relay station 12 and attenuated uplink signal Y3 from the mobile station 16.

A problem arises in the implementation of the embodiment described in FIG. 1. During the operation of the system, one of the relay stations will be transmitting while another is receiving. This can lead to interference at the receiving relay station from the transmitting of a signal by the other relay station. For example in FIG. 2 at time frame 1, the first relay station 12 transmits signal X0. This signal, albeit attenuated, is received as interference at the second relay station 14. Embodiments of the invention seek to minimize this interference by implementing a scheduling algorithm to choose appropriate relay stations that minimize the interference.

Figure 6:
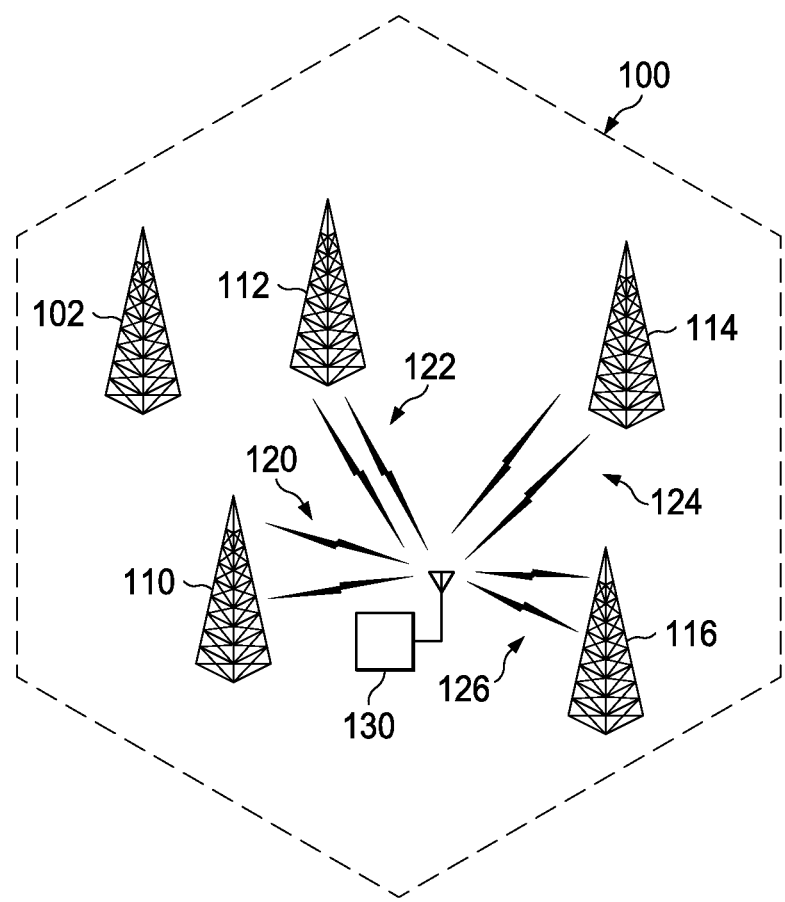
FIG. 6 is a cell network of a wireless system in accordance with embodiments of the present invention.

The scheduling algorithm uses Pre-coding Matrix Index (PMI) information reported back from a mobile station to a base station regarding paths from the base station to the mobile station through various relay stations. For example in the cell network 100 of FIG. 6, mobile station 130 will send PMI information to base station 102 regarding each path through relay stations 110, 112, 114, and 116. The base station 102 then implements the scheduling function to identify the best relay stations to use in relaying signals to the mobile station 130. The algorithm will choose relay stations whose signal beams do not point toward each other so as not to collide or interfere with the reception of signals. For example, relay station 116 has a signal beam 126 that is sufficiently directed at relay station 110 to cause too much interference when relay station 110 is receiving transmissions from the base station 102 or the mobile station 130. Likewise, relay station 110 has a signal beam 120 that would interfere with the reception of signals from the base station 102 or the mobile station 130 by relay station 116. Once the base station 102 identifies the appropriate relay stations, for example relay stations 110 and 112, the base station 102 will send a feed forward message to the mobile station 130 notifying the mobile station 130 of the relay mode and associated relay stations, in this example relay stations 110 and 112, that the base station 102 will be using.

Next, the algorithm considers the beamforming vectors pointing to the mobile station 130 from the chosen relay stations 110 and 112. The algorithm forms the vectors to minimize interference between the chosen relay stations 110 and 112. Another feed forward message is sent to the mobile station 130 notifying it of the relay mode and associated relay stations as well as the beamforming vectors, or PMI indices.

Alternatively, the base station 102 may chose appropriate relay stations merely on the location of the mobile station 130. The base station 102 generally will have information regarding the location of the mobile station 130 within a cell network 100. The method by which a base station 102 obtains this information is well known in the art and is not discussed herein. Based on this information, the base station 102 may locate the appropriate relay stations by identifying the relay stations that are nearest to the mobile station 130. Practically, this method will generally result in identifying the same relay stations as the method above, although in many instances this will not occur. However, this method may reduce the feedback and exchange of information between the base station 102 and the mobile station 130 for the required PMI. The base station 102, in this method, again creates the beamforming vectors pointing to the mobile station 130, and forwards messages to the mobile station 130 notifying the mobile station 130 of the relay mode and associated relay stations as well as the beamforming vectors.

Despite the operation of either algorithm, interference still may occur between the relay stations. A Successive Interference Cancellation (SIC) technique may be used to remove any interference at each relay station.

The base station 102 may switch relay stations during communications between the base station 102 and the mobile station 130. The mobile station 130 will periodically update the PMI information in the base station 102. If conditions within the cell network 100 change, such as a signal beam 120 or 122 of the chosen relay stations 110 or 112, respectively, becomes obstructed or mobile station 130 moves position within the cell network 100, another relay station may become more appropriate to use. For example, assume that signal beam 120 becomes obstructed from mobile station 130 or is dropped for maintenance, the mobile station 130 would update the PMI information in the base station 102, and the base station 102 would implement the scheduling algorithm. The algorithm could replace relay station 110 with relay station 114, and the base station 102 would send the mobile station 130 the appropriate information in a feed forward message. Further, in such a situation, the algorithm could choose to use relay stations 114 and 116 and not relay stations 110 or 112. In another example, mobile station 130 could move to be substantially on the line between relay stations 110 and 112, such that the transmission of signals by either relay station 110 or 112 would greatly interfere with the receiving of signals by the other relay station 112 or 110, respectively. The mobile station 130 would update the PMI information, and the base station 102 would run the scheduling algorithm to select appropriate replacement relay stations.

Figure 7:
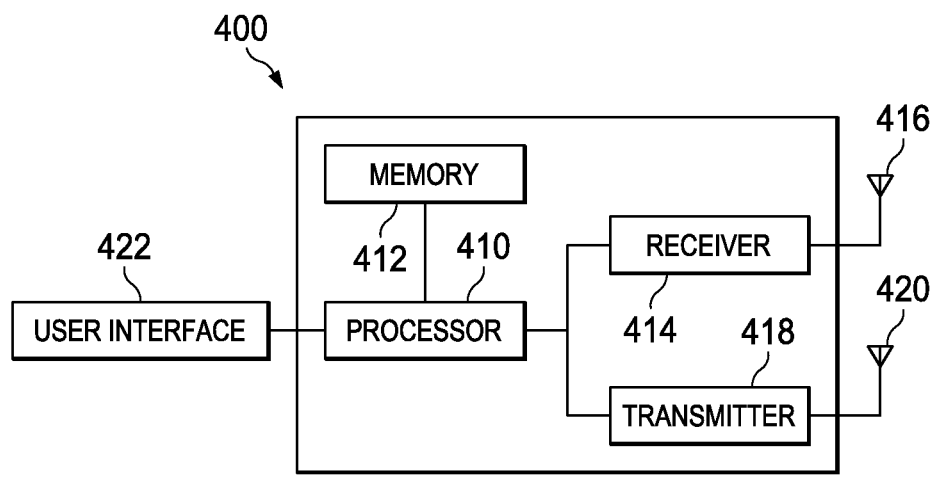
FIG. 7 is a hardware configuration of a station in accordance with embodiments of the present invention.

Embodiments of the invention contemplate the above processes to be carried out by a processor 410 within the station 400, as illustrated in FIG. 7. The station 400 may be a base station or a mobile station. The processor 410 is electrically coupled to a receiver 414 that is coupled to a receive antenna 416. Further, the processor 410 is electrically coupled to a transmitter 418 that is coupled to a transmit antenna 420. Although the antennas 416 and 420 are individually shown, the antennas may be a single antenna that uses a multiplexer to switch between the receiver 414 and the transmitter 418 during receiving links and transmitting links, respectively. Also, a multiple-input multiple-output (MIMO) antenna may be used.

The processor 410 is also electrically coupled to memory 412. The memory 412 may be used to store PMI, beam vectors, signal information, and the like. The processor is further electrically coupled to a user interface 422. The user interface 422 may comprise a speaker, a microphone, a display, a touchtone pad, a user terminal such as a computer, or the like.

If the station 400 is a base station, the processor may implement the algorithms discussed above regarding SICEC, relay station identification, transmission scheduling, and the like. If the station 400 is a mobile station, the processor may implement algorithms for SICEC, transmission scheduling, and the like.

Figure 8:
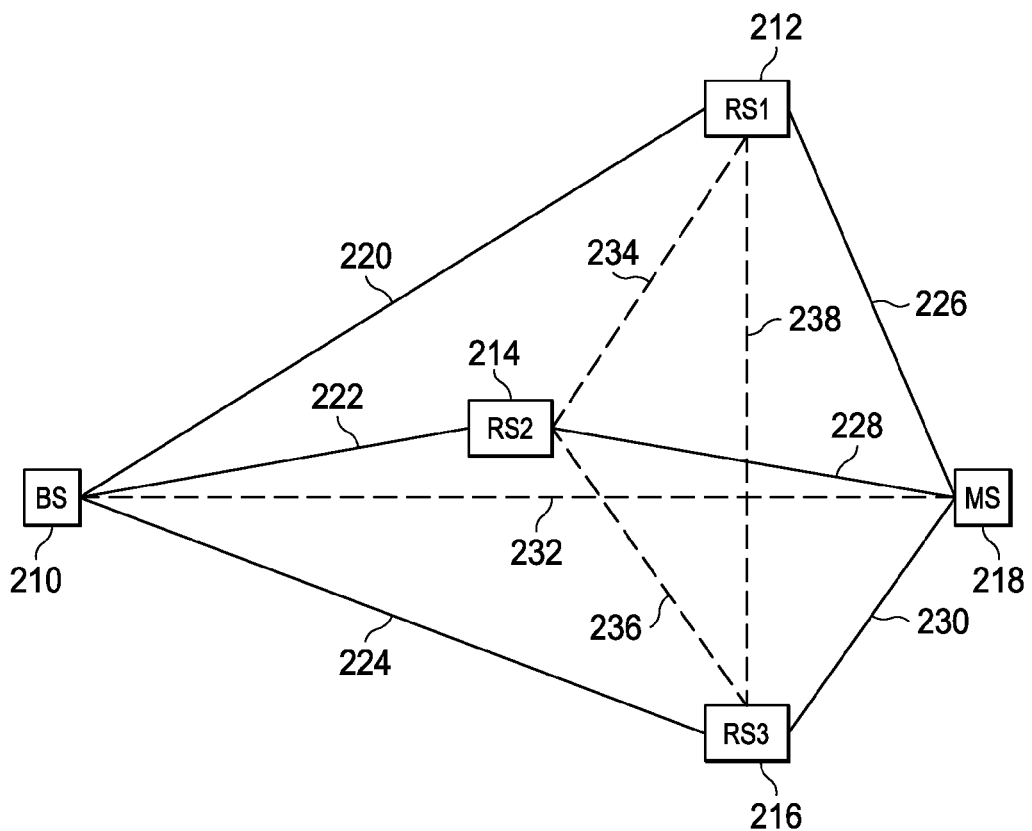
FIG. 8 is an exemplary system for implementing full duplex matched relaying accordance with another embodiment of the present invention.

FIG. 8 illustrates a wireless system for implementing full duplex matched relaying according to another embodiment of the present invention. The system comprises a base station 210, a first relay station 212, a second relay station 214, a third relay station 216 and a mobile station 218. A first, second, and third relay links 220, 222, and 224 are illustrated between the base station 210 and the first, second, and third relay stations 212, 214, and 216, respectively. A first, second, and third access link 226, 228, and 230 are shown between the first, second, and third relay stations 212, 214, and 216 and the mobile station 218, respectively. Further, a direct link 232 between the base station 210 and the mobile station 218 and interference links 234, 236, and 238 between the first, second, and third relay station 212, 214, and 216 are illustrated.

FIGS. 9 and 10 show possible transmission schedules for the system of FIG. 8. In FIG. 9, the schedule allows each relay station to be inactive with regard to the mobile station one-third of the time. This allows the relay stations to be scheduled in such a manner to evenly reduce data through-put through each relay station. In FIG. 10, the schedule allows the second and third relay stations to be inactive half of the time while the first relay station is active for each full frame. This allows the second and third relay stations to share the data through-put to reduce data through the second relay station without affecting the relaying of the first relay station. Many other schedules are possible and are considered within the scope of embodiments of the present invention.

Figure 11:
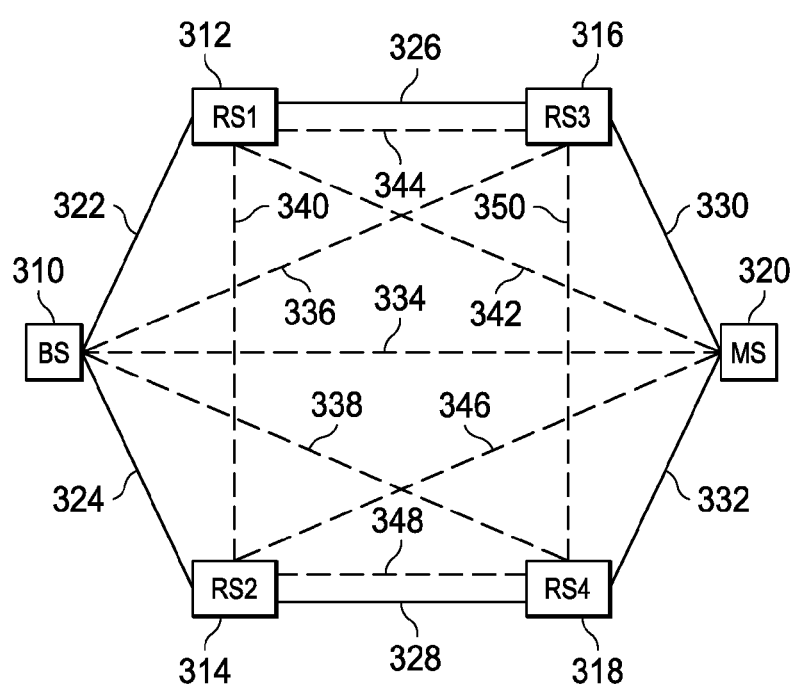
FIG. 11 is an exemplary system for implementing full duplex paired relaying using three hops in accordance with another embodiment of the present invention.

FIG. 11 is a wireless system for implementing full-duplex paired relaying using three hops according to another embodiment of the present invention. The system comprises a base station 310; first, second, third and fourth relay stations 312, 314, 316, and 318, respectively; and a mobile station 320. A first relay link 322 is illustrated between the base station 310 and the first relay station 312, and a second relay link 324 is between the base station 310 and the second relay station 314. First intermediate link 326 is between the first relay station 312 and the third relay station 316, and second intermediate link 328 is between the second relay station 314 and the fourth relay station 318. First access link 330 is between the third relay station 316 and the mobile station 320, and second access link 332 is between the fourth relay station 318 and the mobile station 320.

Direct link 334 between the base station 310 and the mobile station 320 and eight different interference links are illustrated. Interference link 336 is between the base station 310 and the third relay station 316, and interference link 338 is between the base station 310 and the fourth relay station 318. Interference links 340 and 344 link the first relay station 312 to the second relay station 314 and to the third relay station 316, respectively. Interference links 348 and 350 link the fourth relay station 318 to the second relay station 314 and to the third relay station 316, respectively. Interference links 342 and 346 link the mobile station 320 to the first relay station 312 and to the second relay station 314, respectively. No interference link exists between the first relay station 312 and the fourth relay station 318 or between the second relay station 314 and the third relay station 316 because both stations of each pair transmit or receive signals at the same time, as shown in FIG. 12.

FIG. 12 is a transmission schedule for the system in FIG. 11. FIG. 12 illustrates an operation similar to FIG. 5 but with an added hop in the network such that an extra interference signal is detected at each point that receives a signal. For relay stations, the extra signals are viewed as interference; however, at the base station 310 and the mobile station 320, the extra signals can be used to decode signals sent along the uplink and the downlink, respectively. The added signals require extra complexity to the decoding SICEC algorithm, but the same basic principles remain.

The operation of FIGS. 11 and 12 are explained by example signal transmissions during time frames 2 and 3. At time frame 2 during the downlink, the base station 310 transmits signal X2, the second relay station 314 transmits signal X1, and the third relay station 316 transmits signal X0. The first relay station 312 receives signal X2 from the base station 310 via the first relay link 322, interference signal X1 from the second relay station 314 via interference link 340, and interference signal X0 from the third relay station 316 via interference link 344. The fourth relay station 318 receives interference signal X2 from the base station 310 via interference link 338, signal X1 from the second relay station 314 via the second intermediate link 328, and interference signal X0 from the third relay station 316 via interference link 350. The mobile station 320 receives signal X2 from the base station 310 via the direct link 334, signal X1 from the second relay station 314 via interference link 346, and signal X0 from the third relay station 316 via the first access link 330.

During the uplink, the mobile station 320 transmits signal Y4, the third relay station 316 transmits signal Y3, and the second relay station 314 transmits signal Y2. The fourth relay station 318 receives signal Y4 from the mobile station 320 via the second access link 332, interference signal Y3 from the third relay station 316 via interference link 350, and interference signal Y2 from the second relay station 314 via interference link 348. The first relay station 312 receives interference signal Y4 from the mobile station 320 via interference link 342, signal Y3 from the third relay station 316 via the first intermediate link 326, and interference signal Y2 from the second relay station 314 via interference link 340. The base station 310 receives signal Y4 from the mobile station 320 via the direct link 334, signal Y3 from the third relay station 316 via interference link 336, and signal Y2 from the second relay station 314 via the second relay link 324.

At time frame 3 during the downlink, the base station 310 transmits signal X3, the first relay station 312 transmits signal X2, and the fourth relay station 318 transmits signal X1. The second relay station 314 receives signal X3 from the base station 310 via the second relay link 324, interference signal X2 from the first relay station 312 via interference link 340, and interference signal X1 from the fourth relay station 318 via interference link 348. The third relay station 316 receives interference signal X3 from the base station 310 via interference link 336, signal X2 from the first relay station 312 via the first intermediate link 326, and interference signal X1 from the fourth relay station 318 via interference link 350. The mobile station 320 receives signal X3 from the base station 310 via the direct link 334, signal X2 from the first relay station 312 via interference link 342, and signal X1 from the fourth relay station 318 via the second access link 332.

During the uplink, the mobile station 320 transmits signal Y5, the fourth relay station 318 transmits signal Y4, and the first relay station 312 transmits signal Y3. The third relay station 316 receives signal Y5 from the mobile station 320 via the first access link 330, interference signal Y4 from the fourth relay station 318 via interference link 350, and interference signal Y3 from the first relay station 312 via interference link 344. The second relay station 314 receives interference signal Y5 from the mobile station 320 via interference link 346, signal Y4 from the fourth relay station 318 via the second intermediate link 328, and interference signal Y3 from the first relay station 312 via interference link 340. The base station 310 receives signal Y5 from the mobile station 320 via the direct link 334, signal Y4 from the fourth relay station 318 via interference link 338, and signal Y3 from the first relay station 312 via the first relay link 322.

Signals from interference links 342 and 346 from the first and second relay stations 312 and 314 to the mobile station 320, respectively, may be used as indirect signals in decoding rather than interference during downlinks. Otherwise, signals from interference links 342 and 346 will be seen as interference by the first and second relay stations 312 and 314, respectively, during uplinks. Similarly, signals on interference links 336 and 338 to or from the third and fourth relay stations, 316 and 318, respectively, may be interference during downlinks and not uplinks.

Although the present invention and its advantages have been described in detail, it should be understood that various changes, substitutions and alterations can be made herein without departing from the spirit and scope of the invention as defined by the appended claims. For example, many more hops may be included in the wireless system instead of just the two hops and three hops described herein. Further, any number of relay stations may be used at each hop, as long as the number is at least equal to two. The more relay stations that are used may decrease the volume of data through each relay station. Any combination of the number of relay stations and hops may be used, and are considered to be within the scope of embodiments of the invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for wireless communication, the system comprising:
a base station operable to transmit wireless signals to a first relay station, a second relay station, and a third relay station in an interchanging pattern during successive time frames so that the first relay station, the second relay station, and the third relay station forward the wireless signals to a same mobile station;
a receiving station;
the first relay station;
the second relay station; and
the third relay station, wherein the first relay station is operable to transmit a first one of the wireless signals to the same mobile station while the second relay station is receiving a second one of the wireless signals from the base station,
wherein the second relay station is operable to transmit the second one of the wireless signals to the same mobile station while the third relay station is receiving a third one of the wireless signals from the base station,
wherein the third relay station is operable to transmit the third one of the wireless signals to the same mobile station while the first relay station is receiving a fourth one of the wireless signals from the base station,
wherein the receiving station is operable to combine the first one of the wireless signals and the second one of the wireless signals to produce a first enhanced received signal, the first enhanced received signal comprising data common to the transmitted first one of the wireless signals and the transmitted second one of the wireless signals, and
wherein the receiving station is further operable to combine the second one of the wireless signals and the third one of the wireless signals to produce a second enhanced received signal, the second enhanced received signal comprising data common to the transmitted second one of the wireless signals and the transmitted third one of the wireless signals.

2. The system of claim 1 further comprising:
a fourth relay station; and
a fifth relay station, wherein the fourth relay station and the fifth relay station are operable to receive and transmit wireless signals, and wherein the fourth relay station is operable to relay the wireless signals transmitted to the first relay station, and the fifth relay station is operable to relay the wireless signals transmitted to the second relay station.

3. The system of claim 1, wherein the interchanging pattern is an alternating pattern between the first relay station, the second relay station, and the third relay station.

4. A method for matching relay stations for full duplex relaying, the method comprising:
receiving, by a base station, information related to a same mobile station;
identifying, by the base station, a first relay station, a second relay station, and a third relay station using the information related to the same mobile station;
causing, by the base station, the first relay station, the second relay station, and the third relay station each to non-concurrently relay wireless signals to the same mobile station in an interchanging pattern during immediately successive time frames; and
transmitting, by the base station, a first base signal to the first relay station and the same mobile station in a first successive time frame;
wherein a first beam generated from the first relay station directed toward the same mobile station does not generate substantial interference to the second and third relay stations, the first beam generated in a second successive time frame,
wherein a second beam generated from the second relay station directed toward the same mobile station does not generate substantial interference to the first and third relay stations,
wherein a third beam generated from the third relay station directed toward the same mobile station does not generate substantial interference to the first and second relay stations, and
wherein the same mobile station combines the first beam and the first base signal to produce a combined signal, the combined signal comprising data common to the transmitted first base signal and the transmitted first beam.

5. The method of claim 4, wherein the information comprises a pre-coding matrix index (PMI) of the mobile station.

6. The method of claim 4, wherein the information comprises a location of the mobile station.

7. The method of claim 4, wherein causing the first, second and third relay stations to relay wireless signals comprises forming first beamforming vectors of the first relay station, second beamforming vectors of the second relay station, and third beamforming vectors of the third relay station.

8. The method of claim 4, further comprising notifying the mobile station of the first relay station, the second relay station, and the third relay station so that the mobile station can receive a single communication from the wireless signals received in the interchanging pattern.

9. The method of claim 4, further comprising notifying the mobile station of the first beamforming vectors of the first relay station, the second beamforming vectors of the second relay station, and the third beamforming vectors of the third relay station.

10. A method for wirelessly communicating, the method comprising:
receiving, by a same station, first signal information during a first time frame, wherein the first signal information includes signal information from a first transmitted signal that originated from a transmitting station during the first time frame;
receiving, by the same station, second signal information during a second time frame immediately following the first time frame, wherein the second signal information includes signal information from a second transmitted signal that originated from the transmitting station during the second time frame;
receiving, by the same station, retransmitted first signal information from only a first relay during the second time frame;
combining, by the same station, the first signal information and the retransmitted first signal information to obtain the first transmitted signal, the first transmitted signal comprising data common to the transmitted first signal information and the retransmitted first signal information;
receiving, by the same station, third signal information during a third time frame immediately following the second time frame, wherein the third signal information includes signal information from a third transmitted signal that originated from the transmitting station during the third time frame;
receiving, by the same station, retransmitted second signal information from only a second relay during the third time frame immediately following the second time frame;
combining, by the same station, the second signal information and the retransmitted second signal information to obtain the second transmitted signal, the second transmitted signal comprising data common to the transmitted second signal information and the retransmitted second signal information;
receiving, by the same station, retransmitted third signal information from only a third relay during a fourth time frame immediately following the third time frame; and
combining, by the same station, the third signal information and the retransmitted third signal information to obtain the third transmitted signal, the third transmitted signal comprising data common to the transmitted third signal information and the retransmitted third signal information.

11. The method of claim 10, wherein the combinings comprises successive interference cancellation and energy combining.

12. The method of claim 10, wherein the receivings and the combinings are performed at a base station and wherein the transmitting station is a mobile station.

13. The method of claim 10, wherein the receivings and the combinings are performed at a mobile station and wherein the transmitting station is a base station.

14. The method of claim 10, further comprising receiving, by the same station during the first time frame, a relay transmission of an earlier transmitted signal that originated from the transmitting station during a previous time frame before the first time frame.

15. The method of claim 14, further comprising removing components of the earlier transmitted signal prior to the combining the first signal information and the retransmitted first signal information.

16. A method for relaying in a wireless communication system, the method comprising:
receiving a first data signal from a transmitting station during a first time frame;
transmitting, by only a first relay station, the first data signal to a same receiving station during a second time frame immediately subsequent the first time frame;
combining, by the same receiving station during the second time frame, the first data signal received in the first time frame and the first data signal received in the second time frame to produce a first enhanced data signal, the first enhanced data signal comprising data common to the transmitted first data signal received in the first time frame and the transmitted first data signal received in the second time frame;

receiving a third data signal from the transmitting station during a fourth time frame two frames subsequent the second time frame; and transmitting, by only the first relay station, the third data signal to the same receiving station during a fifth time frame immediately subsequent the fourth time frame;

wherein the first data signal and the third data signal comprise only a portion of a data communication that further comprises a second data signal and a third data signal, wherein the second data signal is transmitted to the same receiving station by only a first matched relay station during a third time frame between the second and fourth time frames; and wherein the third data signal is transmitted to the same receiving station by only a second matched relay station during the fourth time frame.

17. The method of claim 16, wherein the transmitting station comprises a base station and wherein the receiving station comprises a mobile station.

18. The method of claim 16, wherein the transmitting station comprises a mobile station and wherein the receiving station comprises a base station.

19. The method of claim 16, wherein the transmitting station comprises a further relay station.

20. A communication device comprising:

a transmitter configured to transmit a first wireless communication message to first, second and third relay stations in a first non-concurrent interchanging pattern during successive first direction time frames, thereby causing the first, second and third relay stations to relay the first communication message to a same wireless device in a second non-concurrent interchanging pattern during a portion of the successive first direction time frames; and a receiver configured to receive a second wireless communication message from the same wireless device via the first, second and third relay stations in a third non-concurrent interchanging pattern during successive second direction time frames, the receiver further configured to cancel transmission interference by combining successive transmitted frames in the successive second direction time frames before decoding the successive transmitted frames.

21. The device of claim 20, wherein the communication device comprises a base station and wherein the first direction time frames are downlink time frames.

22. The device of claim 20, wherein the communication device comprises a mobile handset and wherein the first direction time frames are uplink time frames.

23. The device of claim 20, further comprising a processor coupled to the receiver, the processor configured to perform a successive interference cancellation and energy combining on the received second wireless communication message.

24. The device of claim 20, further comprising:

processing circuitry coupled to the transmitter and the receiver; and a user interface coupled to the processing circuitry.

* * * * *